US008327828B2

(12) United States Patent
Song

(10) Patent No.: US 8,327,828 B2
(45) Date of Patent: Dec. 11, 2012

(54) LPI FUEL SUPPLY SYSTEM

(75) Inventor: Ju Tae Song, Suwon (KR)

(73) Assignee: Hyundai Motor Company, Seoul (KR)

( * ) Notice: Subject to any disclaimer, the term of this patent is extended or adjusted under 35 U.S.C. 154(b) by 84 days.

(21) Appl. No.: 12/621,199

(22) Filed: Nov. 18, 2009

(65) Prior Publication Data

US 2011/0048376 A1 Mar. 3, 2011

(30) Foreign Application Priority Data

Aug. 26, 2009 (KR) ........................ 10-2009-0079453

(51) Int. Cl.
F02M 69/02 (2006.01)
F04B 23/04 (2006.01)
(52) U.S. Cl. .......................................... 123/445; 417/79
(58) Field of Classification Search .................. 123/445, 123/509; 137/115.03; 417/76, 79, 151, 174, 417/295, 410.04
See application file for complete search history.

(56) References Cited

U.S. PATENT DOCUMENTS

| 2,812,715 | A | * | 11/1957 | Redding et al. ................. 417/79 |
| 3,043,104 | A | * | 7/1962 | Magnus, Jr. ............... 60/39.281 |
| 3,043,107 | A | * | 7/1962 | Magaus, Jr. ...................... 417/79 |
| 3,551,073 | A | * | 12/1970 | Petrovits .......................... 417/76 |
| 3,736,072 | A | * | 5/1973 | Turner et al. ..................... 417/79 |
| 3,922,113 | A | * | 11/1975 | Turner ............................. 417/79 |
| 4,037,991 | A | * | 7/1977 | Taylor ............................. 417/80 |
| 4,073,136 | A | * | 2/1978 | Symon ....................... 60/39.281 |
| 4,213,741 | A | * | 7/1980 | Rogers et al. ................... 417/79 |
| 4,339,917 | A | * | 7/1982 | LaGrone .................... 60/39.281 |
| 6,007,306 | A | * | 12/1999 | Vilagines ...................... 417/307 |
| 7,909,023 | B2 | * | 3/2011 | Aoki ............................. 123/516 |
| 2005/0081832 | A1 | * | 4/2005 | Kim ............................. 123/514 |

FOREIGN PATENT DOCUMENTS

| GB | 1 581 978 | 12/1980 |
| JP | 54-120312 A | 9/1979 |
| JP | 57-105544 A | 7/1982 |
| JP | 2004-278355 A | 10/2004 |
| KR | 10 0535592 B1 | 12/2005 |
| KR | 2007-0671357 B1 | 1/2007 |

* cited by examiner

*Primary Examiner* — Mahmoud Gimie
*Assistant Examiner* — David Hamaoui
(74) *Attorney, Agent, or Firm* — Morgan, Lewis & Bockius LLP

(57) ABSTRACT

A fuel supply system may include a fuel tank that is filled with fuel, a fuel pump supplying an engine with the fuel in the fuel tank, a suction line connecting the fuel tank to the fuel pump, a supply line connecting the fuel pump to the engine, and a jet nozzle disposed in the suction line to inject a portion of fuel that is supplied from the fuel pump in a flowing direction of the fuel supplied from the fuel tank.

4 Claims, 4 Drawing Sheets

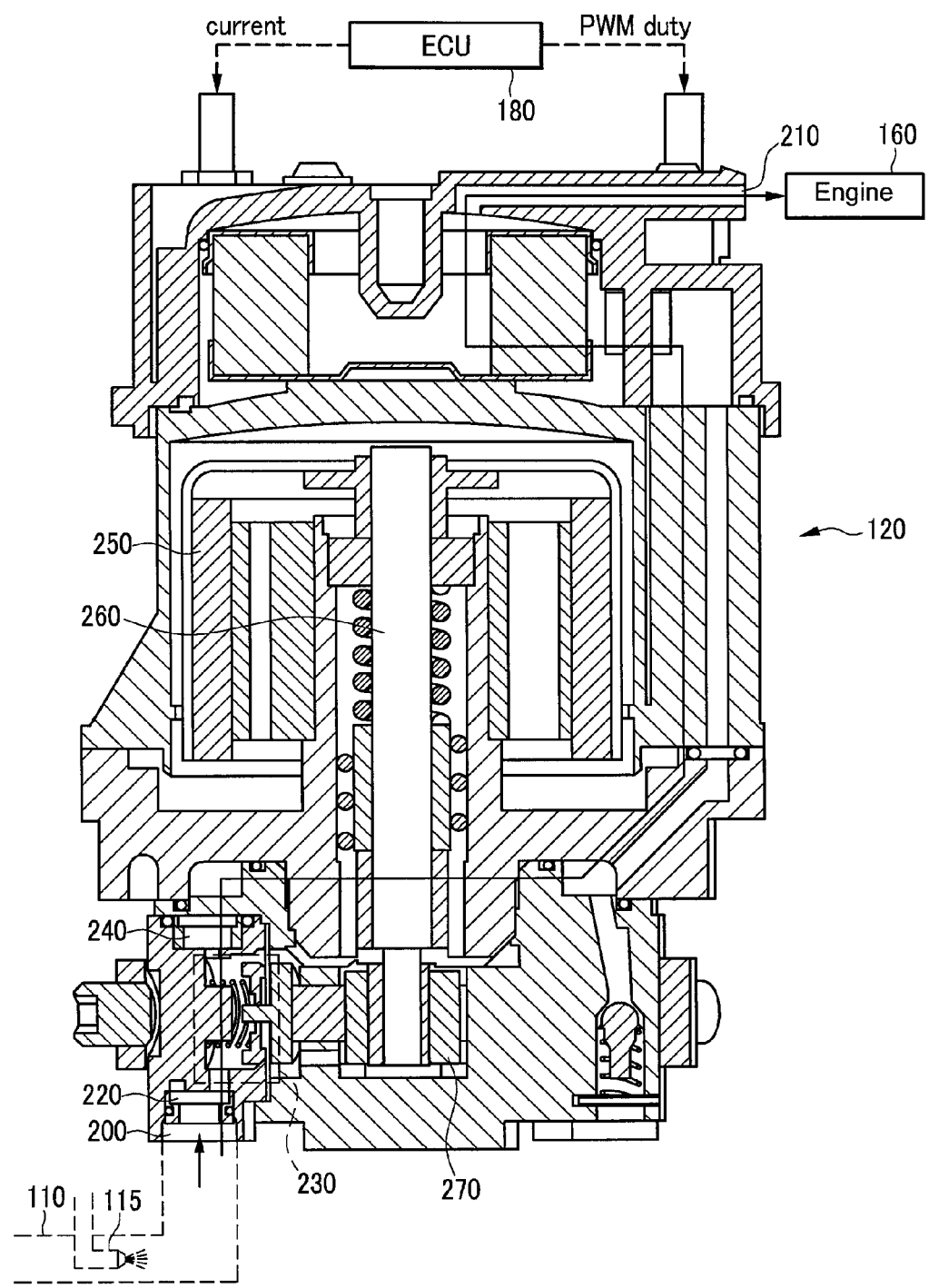

LPI FUEL SUPPLY SYSTEM

CROSS-REFERENCE TO RELATED APPLICATION

The present application claims priority to Korean Patent Application No. 10-2009-0079453 filed on Aug. 26, 2009, the entire contents of which are incorporated herein for all purposes by this reference.

BACKGROUND OF THE INVENTION

1. Field of the Invention

The present invention relates to an LPI fuel supply system. More particularly, the present invention relates to an LPI fuel supply system that securely supplies an engine with fuel from a fuel tank.

2. Description of Related Art

Generally, a liquefied petroleum injection (LPI) engine uses an injector to inject liquefied fuel into a cylinder.

The operation principle of the LPI engine is schematically explained as follows: an electronic control unit (ECU) receives input signals from sensors to detect the condition of the engine and controls a fuel pump, the injector, and an ignition coil so as to optimize air/fuel ratio and engine performance.

That is, the fuel pump is controlled according to the fuel amount that is necessary to supply liquefied fuel to the engine, and the injector sequentially injects the fuel into the cylinders to realize an optimized air/fuel ratio.

The LPI system that is provided to the LPI engine includes a fuel pump that is disposed inside or outside the fuel tank so as to supply the liquefied fuel to the engine.

If the fuel pump supplies the fuel with uniform flux, the injector injects the liquid fuel. Here, the pressure regulator is disposed so as to uniformly sustain the pressure that is applied to the injector. If the pressure that is formed in the supply line is higher than a control pressure, the passage of the pressure regulator is opened to return the fuel to the fuel tank.

However, when the fuel pump is deteriorated or foreign substances are accumulated in the main filter of the fuel pump, there is a problem that the supply capacity of the pump becomes weakened.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a fuel supply system having advantages of securely supplying an injector with fuel from a fuel tank.

In an aspect of the present invention, the fuel supply system may include a fuel tank that is filled with fuel, a fuel pump supplying an engine with the fuel in the fuel tank, a suction line connecting the fuel tank to the fuel pump, a supply line connecting the fuel pump to the engine, and a jet nozzle disposed in the suction line to inject a portion of fuel that is supplied from the fuel pump in a flowing direction of the fuel supplied from the fuel tank.

A portion of the fuel that is supplied from the fuel pump may be supplied to the jet nozzle through a jet line that connects the fuel pump with the jet nozzle.

The fuel pump may include a drive motor, a shaft that is rotated by the drive motor, at least a supply chamber that sucks the fuel from the suction line by the rotation of the shaft to supply the engine with the fuel, and a nozzle chamber that sucks the fuel from the suction line by the rotation of the shaft to supply the jet nozzle with the fuel.

The supply chamber and the nozzle chamber may be disposed in a rotation direction of the shaft at a predetermined circumferential distance based on the shaft.

In another aspect of the present invention, a liquefied petroleum injection (LPI) fuel supply system, may include a fuel tank that is filled with LPI fuel, an injector that is disposed in an engine to directly inject the LPI fuel into a cylinder, a fuel pump that supplies the injector with the LPI fuel from the fuel tank, a suction line that connects the fuel tank with the fuel pump, a supply line that connects the fuel pump with the injector, and a jet nozzle that is disposed in the suction line to inject a portion of fuel that is supplied from the fuel pump in a flowing direction of the LPI fuel supplied from the fuel tank.

A portion of the fuel that is supplied from the fuel pump may be supplied to the jet nozzle through a jet line that connects the fuel pump with the jet nozzle.

The fuel pump may include a drive motor, a shaft that is rotated by the drive motor, at least a supply chamber that sucks the LPI fuel from the suction line by the rotation of the shaft to supply the engine with the LPI fuel, and a nozzle chamber that sucks the LPI fuel from the suction line by the rotation of the shaft to supply the jet nozzle with the LPI fuel.

The supply chamber and the nozzle chamber may be disposed in a rotation direction of the shaft at a predetermined circumferential distance based on the shaft.

In the LPI fuel supply system according to various aspects of the present invention, the jet nozzle is disposed in the suction line to reduce the suction resistance of the fuel pump. Accordingly, the supply and the suction capacity of the fuel pump are securely improved in the fuel supply system.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2A is a first vertical cross-sectional view of a fuel pump that is provided in an LPI fuel supply system according to an exemplary embodiment of the present invention.

Figure 1:
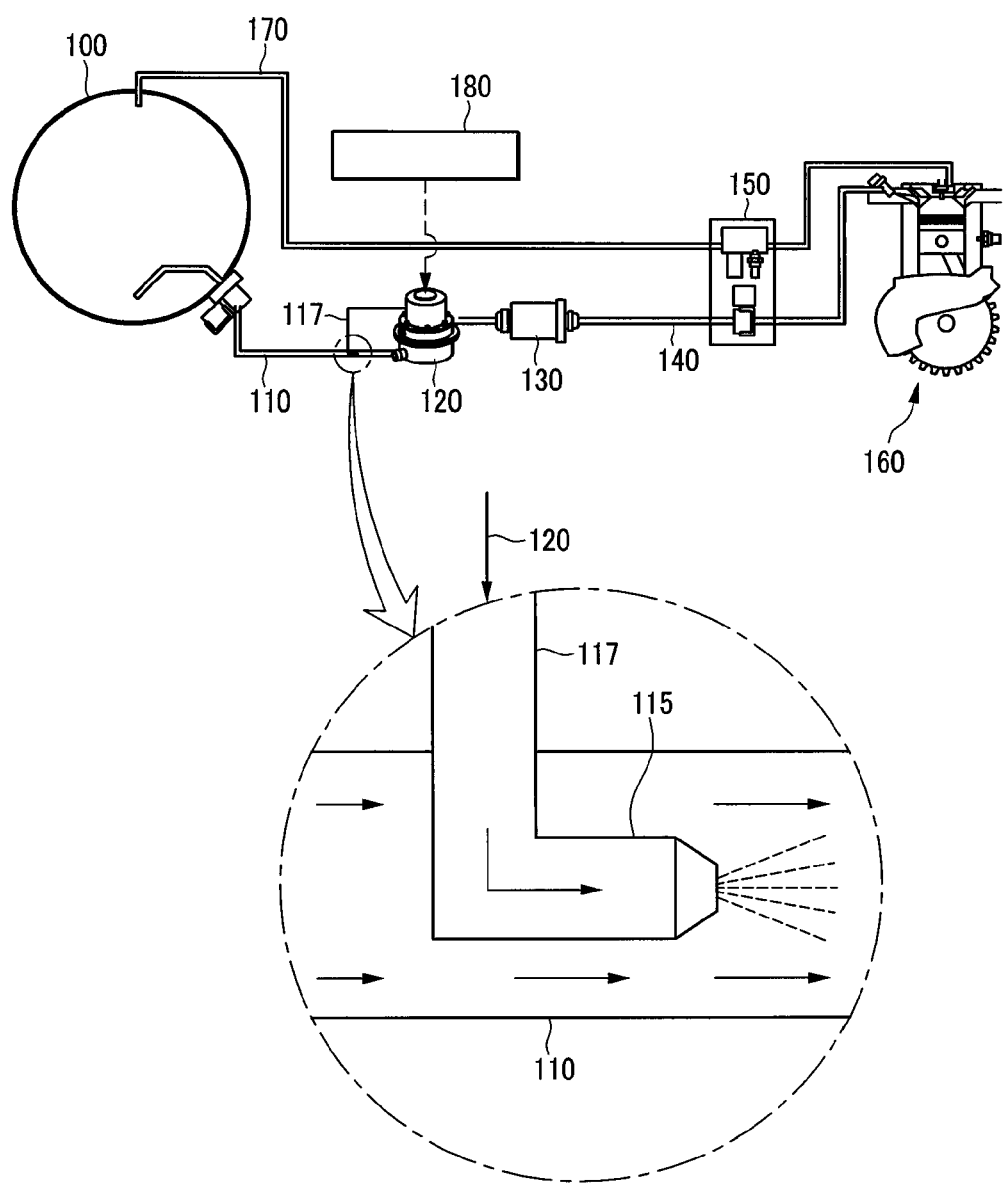
FIG. 1 is a schematic diagram of an LPI fuel supply system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of an LPI fuel supply system according to an exemplary embodiment of the present invention.

Referring to FIG. 1, an LPI fuel supply system includes a fuel tank 100, a suction line 110, a fuel pump 120, a jet nozzle 115, a jet line 117, a supply line 140, a main filter 130, an engine 160, a regulator 150, a return line 170, and a control unit 180.

Liquefied petroleum gas (LPG) fuel is charged in the fuel tank 100, and the fuel pump 120 is disposed outside the fuel tank 100. Optionally, the fuel pump 120 can be mounted inside the fuel tank 100.

The suction line 110 connects the fuel tank 100 with the fuel pump 120, and the supply line 140 connects the fuel pump 120 with an injector (not shown) that is mounted in the engine 160. The injector (not shown) directly injects the fuel that is supplied from the fuel pump 120 into a cylinder.

The main filter 130 is mounted on the supply line 140 to filter foreign substances, and the regulator 150 is mounted on the supply line 140 and the return line 170 to appropriately control the pressure of the supply line 140.

Some fuel is consumed by the injector in the engine 160, and the remainder is returned to the fuel tank 100 through the return line 170.

The jet nozzle 115 is disposed inside the suction line 110, and the jet line 117 connects the fuel pump 120 with the jet nozzle 115.

In an exemplary embodiment of the present invention, the fuel that is supplied from the fuel pump 120 is mainly supplied to the engine through the supply line 40, and some fuel is injected from the jet nozzle 115 through the jet line 117.

Referring to the enlarged part of FIG. 1, the jet nozzle 115 is disposed in the middle of the fuel passage inside the suction line 110, and the jet nozzle 115 that is connected to the jet line 117 injects the fuel that is supplied from the fuel pump 120 at a high speed.

In an exemplary embodiment of the present invention, the fuel is injected in a fuel flowing direction through the jet nozzle 115 from the fuel tank 100 to the fuel pump 120. Accordingly, the suction efficiency of the fuel pump 120 is improved.

FIG. 2A is a first vertical cross-sectional view of a fuel pump that is provided in an LPI fuel supply system according to an exemplary embodiment of the present invention.

Referring to FIG. 2A, an inlet 200, through which the fuel flows in, is formed at the left side of the lower end of the fuel pump 120, and a first outlet 210, through which the fuel is supplied to the engine 160, is formed at the right side of the upper end thereof.

The fuel passage is formed from the inlet 200 to the first outlet 210, and a supply chamber 230 is formed in the middle of the passage to pump the fuel from the inlet 200 to the first outlet 210. Check valves 220 and 240 are respectively disposed at the inlet and the outlet of the supply chamber 230 to prevent the pumped fuel from flowing backward.

A drive motor 250 is disposed to be operated by electric energy at the middle of the upper part of the fuel pump 120, and the drive motor 250 rotates a shaft 260. An eccentric cam 270 of which the center is eccentric from that of the shaft 260 is fixed at the end portion of the shaft 260.

Here, a diaphragm in the supply chamber 230 reciprocates by the eccentric cam 270 that is rotated by the shaft 260 to pump the fuel from the inlet 200 to the first outlet 210.

Figure 2B:
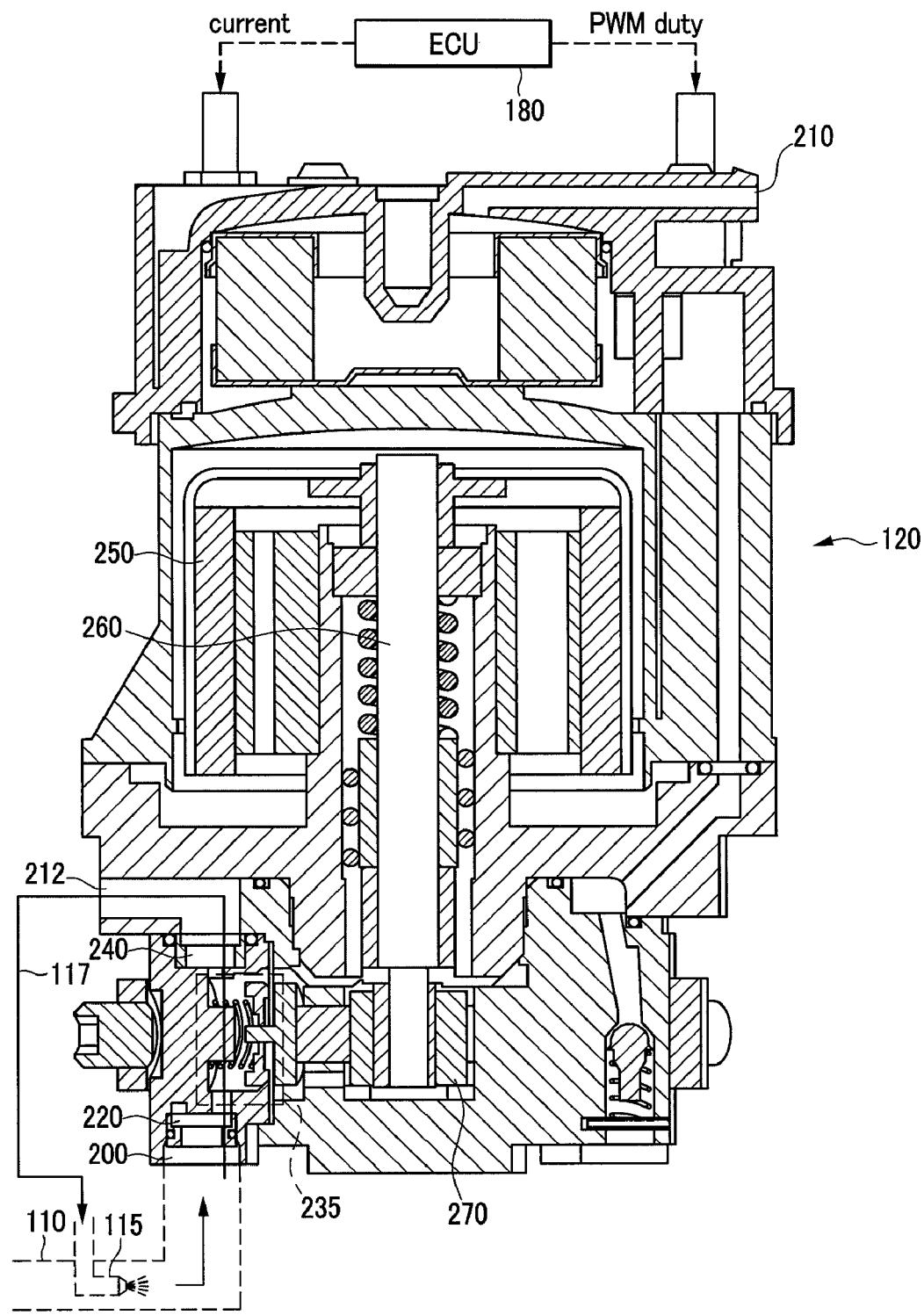
FIG. 2B is a second vertical cross-sectional view of a fuel pump that is provided in an LPI fuel supply system according to an exemplary embodiment of the present invention.

FIG. 2B is a second vertical cross-sectional view of a fuel pump that is provided in an LPI fuel supply system according to an exemplary embodiment of the present invention.

Referring to FIG. 2B, an inlet 200, through which the fuel flows in, is formed at the left side of the lower end of the fuel pump 120, and a second outlet 212, through which the fuel is supplied to the jet nozzle 115, is formed at the upper left thereof.

The fuel passage is formed from the inlet 200 to the second outlet 212, and a nozzle chamber 235 is formed in the middle of the passage to pump the fuel from the inlet 200 to the second outlet 212. Check valves 220 and 240 are respectively disposed at the inlet and the outlet of the nozzle chamber 235 to prevent the pumped fuel from flowing backward.

Here, a diaphragm in the nozzle chamber 235 reciprocates by the eccentric cam 270 that is rotated by the shaft 260 to pump the fuel from the inlet 200 to the second outlet 212.

The inlet 200 is connected to the suction line 110, the second outlet 212 is connected to the jet line 117, and the fuel that is pumped from the nozzle chamber 235 is injected through the jet nozzle 115 in a fuel flowing direction in a high speed such that the suction resistance of the fuel pump 120 is reduced.

Figure 3:
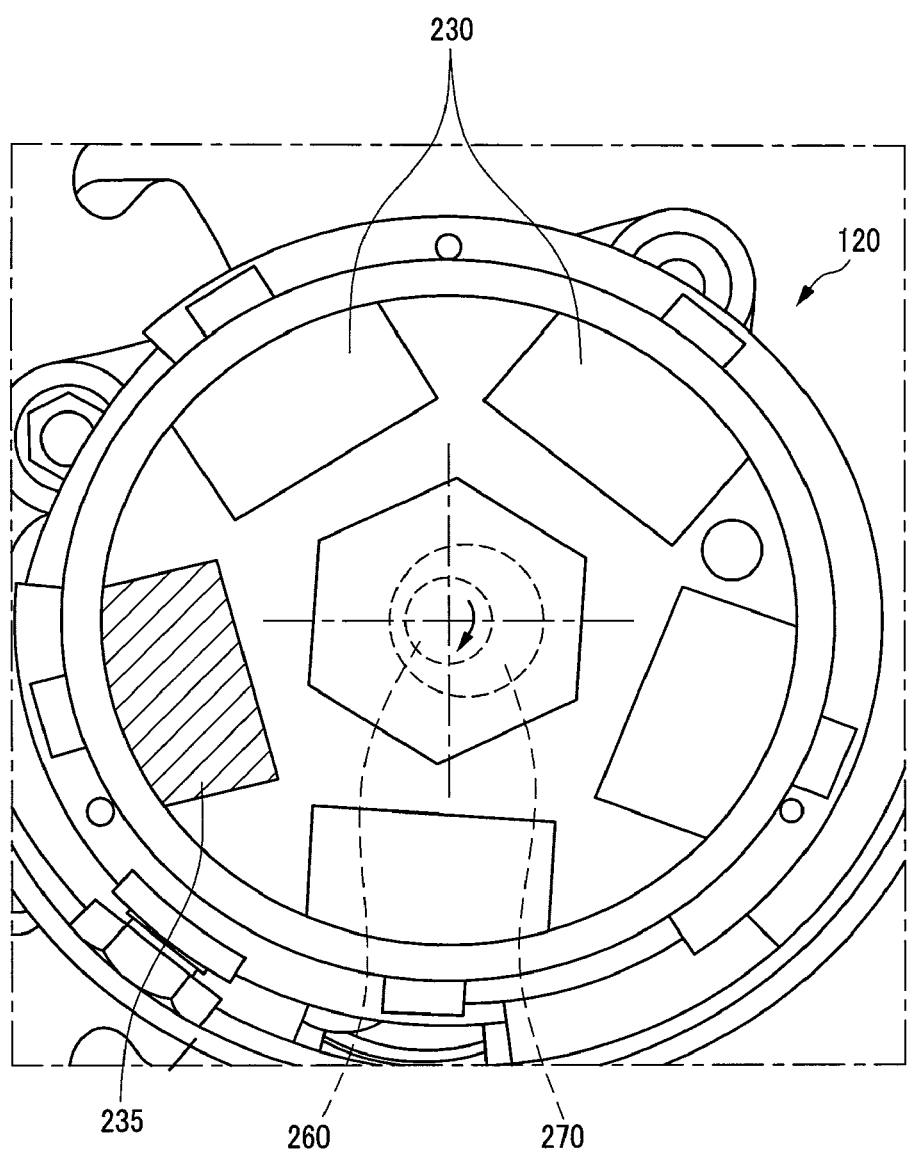
FIG. 3 is a horizontal cross-sectional view of a fuel pump that is provided in an LPI fuel supply system according to an exemplary embodiment of the present invention.

FIG. 3 is a horizontal cross-sectional view of a fuel pump that is provided in an LPI fuel supply system according to an exemplary embodiment of the present invention.

Referring to FIG. 3, the supply chamber 230 and the nozzle chamber 235 are disposed in a rotating direction of the shaft 260 based on the shaft 260 that is rotated by the drive motor 250 with a predetermined uniform angle in the fuel pump 120.

Four supply chambers 230 are formed, and one nozzle chamber 235 is formed in an exemplary embodiment of the present invention. As described above, the fuel is mainly pumped to the engine 160 by the supply chamber 230, and some fuel is circulated to the jet nozzle 115 by the nozzle chamber 235.

Accordingly, when the fuel pump 120 sucks the fuel through the suction line 110, the suction resistance thereof is reduced to securely pump the fuel to the engine.

For convenience in explanation and accurate definition in the appended claims, the terms "upper", "lower", "left", and "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents

What is claimed is:

1. A fuel supply system comprising:
a fuel tank that is filled with fuel;
a fuel pump supplying an engine with the fuel in the fuel tank;
a suction line connecting the fuel tank to the fuel pump;
a supply line connecting a first outlet of the fuel pump to the engine; and
a jet nozzle disposed in the suction line to inject a portion of fuel that-is supplied from the fuel pump in a flowing direction of the fuel supplied from the fuel tank;
wherein a portion of the fuel that is supplied from the fuel pump is supplied to the jet nozzle through a jet line that directly fluidly connects a second outlet of the fuel pump with the jet nozzle;
wherein the fuel pump includes:
a drive motor;
a shaft that is rotated by the drive motor;
at least a supply chamber that sucks the fuel from the suction line by the rotation of the shaft to supply the engine with the fuel; and
a nozzle chamber that sucks the fuel from the suction line by the rotation of the shaft to supply the jet nozzle with the fuel via the second outlet, wherein the second outlet is not directly fluidly connected to the supply line; and
wherein the at least a supply chamber and the nozzle chamber are disposed in a rotational direction of the shaft at a predetermined angle based on the shaft;
wherein first and second check valves are respectively mounted at an inlet and an outlet of the at least a supply chamber to prevent fuel in the supply chamber from flowing backward into the suction line; and
wherein third and fourth check valves are respectively mounted at an inlet and an outlet of the nozzle chamber to prevent fuel in the nozzle chamber from flowing backward into the suction line.

2. The fuel supply system of claim 1, wherein each of the at least a supply chamber and the nozzle chamber are provided with a reciprocal diaphram, which is driven by an eccentric cam provided on the drive shaft.

3. A liquefied petroleum injection (LPI) fuel supply system,
comprising:
a fuel tank that is filled with LPI fuel;
an injector that is disposed in an engine to directly inject the LPI fuel into a cylinder;
a fuel pump that supplies the injector with the LPI fuel from the fuel tank;
a suction line that connects the fuel tank with the fuel pump;
a supply line that connects a first outlet of the fuel pump with the injector; and
a jet nozzle that is disposed in the suction line to inject a portion of fuel t-haV4s supplied from the fuel pump in a flowing direction of the LPI fuel supplied from the fuel tank;
wherein a portion of the fuel that is supplied from the fuel pump is supplied to the jet nozzle through a jet line that directly fluidly connects a second outlet of the fuel pump with the jet nozzle;
wherein the fuel pump includes:
a drive motor;
a shaft that is rotated by the drive motor;
at least a supply chamber that sucks the LPI fuel from the suction line by the rotation of the shaft to supply the engine with the LPI fuel; and
a nozzle chamber that sucks the LPI fuel from the suction line by the rotation of the shaft to supply the jet nozzle with the LPI fuel via the second outlet, wherein the second outlet is not directly fluidly connected to the supply line; and
wherein the at least a supply chamber and the nozzle chamber are disposed in a rotational direction of the shaft at a predetermined angle based on the shaft;
wherein first and second check valves are respectively mounted at an inlet and an outlet of the at least a supply chamber to prevent fuel in the supply chamber from flowing backward into the suction line; and
wherein third and fourth check valves are respectively mounted at an inlet and the outlet of the nozzle chamber to prevent fuel in the nozzle chamber from flowing backward into the suction line.

4. The fuel supply system of claim 3, wherein each of the at least a supply chamber and the nozzle chamber are provided with a reciprocal diaphram, which is driven by an eccentric cam provided on the drive shaft.

* * * * *